United States Patent
McKeeman et al.

(10) Patent No.: US 9,246,898 B2
(45) Date of Patent: Jan. 26, 2016

(54) SYSTEM AND METHOD FOR SECURELY DISTRIBUTING LEGAL EVIDENCE

(71) Applicant: Utility Associates, Inc., Tucker, GA (US)

(72) Inventors: Robert S. McKeeman, Atlanta, GA (US); Ted M. Davis, Decatur, GA (US)

(73) Assignee: Utility Associates, Inc., Tucker, GA (US)

(*) Notice: Subject to any disclaimer, the term of this patent is extended or adjusted under 35 U.S.C. 154(b) by 57 days.

(21) Appl. No.: 14/084,072

(22) Filed: Nov. 19, 2013

(65) Prior Publication Data

US 2014/0143545 A1 May 22, 2014

Related U.S. Application Data

(60) Provisional application No. 61/728,598, filed on Nov. 20, 2012, provisional application No. 61/788,057, filed on Mar. 15, 2013.

(51) Int. Cl.
 *G06F 7/04* (2006.01)
 *H04L 29/06* (2006.01)
(52) U.S. Cl.
 CPC ............ *H04L 63/08* (2013.01); *H04L 63/0428* (2013.01); *H04L 63/0853* (2013.01)
(58) Field of Classification Search
 CPC ........................... G06F 21/10; G11B 20/00086
 USPC ...................................................... 726/26–30
 See application file for complete search history.

(56) References Cited

U.S. PATENT DOCUMENTS

| | | | |
|---|---|---|---|
| 2009/0249014 A1* | 10/2009 | Obereiner et al. | 711/164 |
| 2010/0265068 A1 | 10/2010 | Brackmann et al. | |
| 2010/0281223 A1 | 11/2010 | Wolfe et al. | |
| 2012/0229672 A1* | 9/2012 | Cok et al. | 348/231.2 |
| 2013/0018953 A1* | 1/2013 | McConnell et al. | 709/204 |
| 2013/0055382 A1* | 2/2013 | Bhattiprolu et al. | 726/19 |
| 2013/0101162 A1* | 4/2013 | Vitsnudel et al. | 382/103 |
| 2013/0107309 A1* | 5/2013 | Kondoh | 358/1.14 |

FOREIGN PATENT DOCUMENTS

WO  WO 2011/094128 A2  8/2011

OTHER PUBLICATIONS

The International Search Report/Written Opinion prepared by the U.S. Patent & Trademark Office dated Feb. 6, 2014; 13 pages.

* cited by examiner

*Primary Examiner* — Anthony Brown
(74) *Attorney, Agent, or Firm* — Smith Gambrell & Russell LLP

(57) ABSTRACT

This invention provides a system and method to search for and securely download Digital MultiMedia Evidence (DME) data from a central DME repository to portable USB, smart phone, tablet, laptop, desktop, or other data storage devices, with a clear chain of custody and access control audit trail reporting, so the DME can be used to prepare for and conduct legal proceedings.

26 Claims, 5 Drawing Sheets

SYSTEM AND METHOD FOR SECURELY DISTRIBUTING LEGAL EVIDENCE

CLAIM OF PRIORITY

This application claims priority from U.S. Provisional Patent Application Ser. No. 61/728,598, filed Nov. 20, 2012, and from U.S. Provisional Patent Application Ser. No. 61/788,057, filed Mar. 15, 2013, which are incorporated herein in their entirety.

BACKGROUND OF THE INVENTION

The present invention is in the technical field of distribution of legal evidence. More particularly, the present invention is in the technical field of the cybersecurity triad of Confidentiality, Integrity, and Availability for securely distributing legal evidence to various authorized parties within the legal system. Legal evidence can include text, graphics, images, word processing, spreadsheet, .pdf and other computer data files, telemetry data, audio recording files, video files, audio and video metadata, biometrics data, such as fingerprints, voiceprints, Iris scans, and facial point scans, and other types of analog and digital information captured about a legal incident and the parties involved in a legal incident. Confidentiality requires limiting access to legal evidence data to only authorized legal system participants, and tracking and reporting date, time, MAC address, and other metadata for each access to legal evidence data. Integrity requires validating the chain of custody to ensure that legal evidence has not been edited or altered in any way from the time it was captured until it is used. Availability requires making legal evidence data available as needed to defendants, victims, defense attorneys, prosecutors, police, judges, court employees, and other legal system participants to support and participate in the legal process.

A wide variety of audio, video, image, and other electronic evidence is being captured by law enforcement agencies and other sources. Typically the evidence is recorded by audio and video camera recorder systems installed in police cars and other first responder vehicles, from body-worn microphones and video cameras worn by police officers, from fixed location audio microphones, from video cameras attached to buildings, street light poles, traffic light poles, and wires, and from other locations and sources. New devices such as Google Glass can provide video and audio streams from a wearer point of view similar to other body worn cameras. Sometimes combinations of several audio sources are recorded by different microphones at different locations, and then triangulation calculation algorithms identify the geographic coordinates of the source of a sound—such as where a weapon was fired. The audio, video, and images are used as evidence for DUI stops, traffic stops, shootings, robberies, assaults, traffic accidents, speeding, and other events and situations where audio, video, image, and metadata evidence is captured. In some cases data is still captured on analog microphones and video cameras and then converted to a digital format to be marked and stored. Increasingly, however, source data is captured using digital microphones and digital cameras, so no need exists to convert analog signals to digital format. Regardless of how captured, audio, video, and images are recorded on various storage media such as VHS tapes, CD-ROM disks, DVD disks, spinning hard drives, solid state hard drives, and solid state data storage chipsets, such as Compact Flash (CF) and Micro Secure Digital (MicroSD) non-volatile memory cards.

Typically audio, video, and image evidence data is enhanced with metadata (metadata=data about data) and combined all together into an integrated data stream of digital multimedia evidence (DME). Metadata often includes electronic tags of start and stop points of interest such as where and when the vehicle siren or lightbar was turned on or off; tags of latitude, longitude, date and time of when an officer pressed a record button or where an officer witnessed evidence being tossed out of a vehicle being pursued; and other location and time-based metadata, that enhances the searchability, reliability, and legal evidence value of the video, audio, and images collected. Most systems have a pre-record ability to always retain a looping amount of DME before an event occurs—i.e. retain the prior 30 or 60 seconds of video and audio recorded before an officer noticed an event and flipped on the siren or light bar, which automatically started a DME record process. In some cases audio and/or video data is processed by computer algorithms, which algorithms generate additional metadata such as gunshot location latitude, longitude, date and time, perform automated license plate number recognition, and capture other types of metadata. Police officers often have the ability to add notes to integrated video and audio streams tagged at specific dates and times when an event happened. This additional metadata can include descriptions of events, including information about vehicle drivers, passengers, and bystanders, such as name, address, phone number, age, height, weight, driver's license number, sobriety test results, injuries, and statements. Similarly, metadata about vehicles could include VIN number, license plate number and expiration date, make, model, color, year, observed damage, speed, heading, location and descriptions of possible evidence observed in and around the vehicle, open containers, contraband in and around a vehicle, insurance carrier and vehicle registration details, and other vehicle data. Incident metadata can include pictures, video, audio recordings, and descriptions of weather, nearby construction, obstructions and road hazards, tire skid patterns and lengths, witness comments, and other metadata. Audio and video camera recording systems use various methods and data formats to capture metadata and embed it into an integrated data stream along with audio and video analog and digital data in various standard and/or proprietary video, audio, and metadata formats. This integrated data stream of DME is often key to criminal and civil legal proceedings.

The audio, video, pictures, and metadata is transferred from a DME recording system in a police car or other first responder vehicle to a central storage system, so it can be securely stored, backed up, viewed, distributed, and retained for future legal proceedings. This DME transfer can be performed real-time through some kind of wireless streaming, or on a batch wireless offload basis when a vehicle comes in range of a wireless data transfer location such as a police station parking lot, fueling station, sally port at a jail, a fire station, or other authorized offload location during the course of a shift. An end-of-shift batch data transfer can also be performed using a wired network interface physical connection from the vehicle DME data recorder, a wireless network interface such as 802.11a/b/g/n/ac, or by physically carrying removable storage media from the vehicle DME recorder to a fixed location media reader device. In all cases the integrated DME data stream is transferred to one or more central DME repositories and/or servers. In a similar manner, audio, video, and metadata from fixed location audio microphones, still cameras, remotely controlled Pan-Tilt-Zoom (PTZ) cameras, and video cameras are transferred in some wired or wireless manner to a central DME storage system. In all cases the video, audio, image, and metadata is securely and reliably transferred from a DME recorder located in the vehicle to another location. The integrity of the transferred file(s) is validated before the DME is deleted from the source vehicle DME recorder to make room for new DME.

Originally VHS tapes were removed from a VHS tape recorder located in the trunk of the police car, hand-carried to an evidence storage room at the police station, and manually logged into an evidence storage room by an evidence records clerk. Some vehicle DME systems "burn" the audio and video onto a CD-ROM, DVD, or Blu-Ray disk using an integrated CD-ROM, DVD, or Blu-Ray burner built inside the vehicle DME recorder system. The Watchguard DV-1 is an example of such an in-vehicle CD burner system. Newer DME recorder systems store the audio, video, and metadata on a fixed or removable spinning hard drive, fixed or removable solid-state hard drive, compact flash (CF) card, MicroSD card, or other solid-state storage media. The DME removable drive can be hand carried to an offload connection or reader. The vehicle DME recorder can also use a wired network connection to transfer evidence data to a central DME storage area network system. A vehicle DME recorder system can also wirelessly connect to a wireless access point at various times to perform a batch upload transfer of all audio, video, and metadata to a central DME storage area network. Wireless microphones and video cameras worn by first responders can wirelessly cache and stream audio, video, and metadata to a nearby vehicle DME recorder or directly to a central DME storage area network, or can capture data on removable data storage media that is batch uploaded to a central DME storage area network. A DME recorder system can often stream audio, video, images, and metadata on a real-time basis over wireless networks back to a central dispatch display console, or to other vehicle computers so that real time video and audio is available for viewing by other police officers and supervisors in the field, by dispatchers in central dispatch, and by other authorized viewers in most any location with network access. Fixed location microphones, video cameras, and still cameras installed on buildings, poles, and traffic lights can also stream live audio, video, and still images to a central DME storage and management system. In all cases, audio, video, image, and/or metadata DME files are captured out in the field from vehicle based DME recorder systems from a variety of sources and are transferred to a central DME storage system.

Once the audio, video, images, and metadata has been captured from the field and logged into a central DME storage system, it will then need to be made available to various entities that are authorized to have access to the DME. These authorized entities can include defendants, victims, defense attorneys, prosecutors, police officers and supervisors, judges, and court employees. In some cases the DME files are made available to the news media and other external parties. DME needs to be made available consistent with the Confidentiality, Integrity, and Availability legal evidence and business rules established by the legal jurisdiction where the evidence was captured. Metadata is very useful for searching to go directly to the evidence in question, and to do searches across DME from multiple events and domains. For example, a prosecutor may want to know if a vehicle or driver has been involved in any other event or incident in the past 6 or 12 months or elsewhere in the county, city, or state where the incident in question occurred.

The typical method currently used to distribute evidence to various authorized entities is to "burn" audio and video data files to a CD-ROM, DVD, or Blu-Ray disks. In the past audio and video was copied to VHS videotape cartridges for distribution, but this method is now rarely used. It is important to note that "burning" audio and video files to a CD-ROM, DVD, or Blu-Ray disk is a slow, time consuming process. An hour of video is often 1 GB of data or more. The elapsed time required to create a data disk depends upon the data transfer rate of the CD-ROM, DVD, or Blu-Ray burner hardware installed in a desktop or laptop computer, or a CD-ROM/DVD/Blu-Ray robot machine designed for high volume production of CD-ROM, DVD, Blu-Ray disks. Many CD-ROM recorder drives can only transfer ("burn") data at the rate of 2× to 4×—300K to 600K per second. For a CD-ROM disk, the total "burn" time for a full disk can be 10 to 20 or more minutes. The DVD "burn" time for a 1 GB video file can be in the range of 7 to 10 minutes. CD-ROM, DVD, and Blu-Ray disks are subject to scratching and other physical damage that can make the disk unreadable. The magnetic or laser substrate on the disks can also deteriorate over time, making the disks unreadable after a number of years.

Police officers and clerks often spend significant time after the end of a shift and at other times manually "burning" a CD-ROM, DVD, or Blu-Ray disk of evidence to provide to Supervisors, Prosecutors, Defense Attorneys, Courts, and other authorized entities. Many First Responder organizations devote significant clerical effort or even have dedicated staff that do nothing but "burn" CD-ROM, DVD, or Blu-Ray evidence disks as their primary job function. First Responders often have dedicated personal computer workstation hardware devoted solely to being available as CD-ROM, DVD, or Blu-Ray "burners" for Police Officers, other First Responders, and clerical staff. Alternatively the First Responder organization has to purchase and support an automated CD-ROM, DVD, or Blu-Ray burner robot that can automatically feed blank CD-ROM, DVD, or Blu-Ray disks into a "burner" slot, and "burn" the legal evidence data onto the disk from a queue of burn requests sent by various users. Someone still has to load blank CD-ROM, DVD, or Blu-Ray disks into the robot. In some cases the personal computer can not be used for any other purpose while the disk is being "burned". If the burner robot does not automatically burn labels on the disk, someone manually has to label the disk. Someone also has to manually distribute the physical CD-ROM, DVD, or Blu-Ray disks to the person(s) who requested a copy of the evidence data via interoffice mail, US Mail, Courier, FedEx, UPS, or hand delivery. So the process of "burning" and labeling DME on CD-ROM, DVD, or Blu-Ray disks to distribute the legal evidence to authorized parties is an expensive, tedious, time-consuming, and error-prone process subject to long delays between request and receipt of DME. The process relies upon fallible human beings to manually distribute legal evidence media, with significant risk that legal evidence will be misplaced, lost, or will come into the possession of an unauthorized user(s), with error-prone or no audit trails of who actually received and had access to the legal DME.

Furthermore, in many cases some or all of the metadata captured along with the audio and video is not "burned" onto the CD-ROM, DVD, or Blu-Ray disk. Therefore this additional time, date, location and other metadata about the evidence is not available to the recipient of the legal evidence. The recipient only gets the raw audio and video tracks, so some of the evidence collected at an incident scene is not available to the ultimate user—prosecutor, defense attorney, judge, and court system. The user loses the ability to quickly search for relevant DME based upon metadata tags, and loses notes and other descriptive metadata around the audio and video.

Control over access to the evidence data is lost if the disk is misplaced or stolen. Many of the audio and video file storage formats are common standards, without any security or encryption. Furthermore, most personal computers and laptops have CD-ROM, DVD, or Blu-Ray drives, have audio and video viewing software that support many of the standard audio and video data storage formats, and can be operated without being connected to any network. Anyone coming into possession of a DME disk could easily use or purchase a computer for a few hundred dollars that would allow them to listen to, view, copy, and further distribute the DME, with no reporting or audit trail of who has viewed or copied the DME contained on the disk. Once a CD-ROM, DVD, or Blu-Ray disk has been "burned", the evidence is generally available to anyone who has physical possession of the disk.

A more secure and reliable way to distribute legal evidence data is needed.

SUMMARY OF THE INVENTION

The present invention is a method of replacing the physical production and distribution of CD-ROM, DVD, and Blu-Ray legal evidence disks with a more secure solid-state data storage and access device—the EvidenceKey—to distribute DME. The EvidenceKey can be implemented using a variety of solid-state storage platforms combined with licensed access and data storage software and/or recurring revenue access control and distribution software as a service and cloud-based data storage and distribution services.

In an aspect of one type of implementation, the EvidenceKey device is a USB 1.0, 2.0, or 3.0, or other data storage device with embedded audio, video, and metadata evidence player software, user ID and password access control software, and/or Virtual Private Network (VPN) client software. The EvidenceKey user inserts the USB EvidenceKey into a desktop or laptop computer USB port, whereby embedded VPN client software can establish a secure network connection from a computer on the interne to a "cloud-based" DME repository out on the Internet. The user can then search for DME the user is authorized to access and download the DME to the USB EvidenceKey. The embedded player software on the EvidenceKey allows the user to use all metadata tags to search for and play DME, and to access all the notes and other metadata included along with video and audio. Storing the DME and required access control software on the USB solid-state storage device makes the legal DME accessible at most any computer, yet provides strong controls limiting access to the DME to only authorized users. Access control logic can securely store and securely erase all DME stored on the EvidenceKey after a parameter driven number of failed login attempts. Full access control audit trail logs of when, where, IP address, MAC address, and other security identifiers of computers used to search and play DME are automatically stored on the EvidenceKey device and are securely uploaded over the VPN connection whenever the EvidenceKey device is attached to a network connected computer. The integrated VPN client software provides secure downloading of legal DME to the EvidenceKey device over most any wired or wireless connection. The USB-based EvidenceKey storage device is small and portable, making it easy for an authorized user to keep downloaded DME with them at all times, and able to play DME without having a live connection to the Internet. EvidenceKeys are permanently uniquely identified. The DME administrator authorizes which EvidenceKeys can identify a particular DME item in a search result set, and which EvidenceKeys can download the DME object. The administrator can also optionally set start and stop dates and times when the DME can be played from the EvidenceKey device.

In an aspect of another type of implementation, the EvidenceKey is implemented as a software application (app) that is installed on a smart phone. This implementation version leverages the communications, solid-state storage, display, audio output, and/or digital rights management software included in the smart phone. EvidenceKey apps can be downloaded from on-line app stores for iPhones, Android, Nokia, Microsoft, and/or other smart phone platforms. The EvidenceKey app can be restricted to only install based upon unique smart phone identifiers such as UDID numbers and other unique smart phone identifiers. Alternatively, the EvidenceKey app authentication security application or lock code can be embedded on a specialized Micro SD, CF card or other hardware storage device that must be installed into the smartphone to download, install, and/or access the EvidenceKey app. The EvidenceKey smart phone application software provides the same secure VPN, metadata search, DME download, DME display, and access control audit trail logging as described for the USB EvidenceKey. In both cases, two-factor security authentication is provided using a unique smart phone identification number or inserted memory device (something you have) combined with a user ID and password (something you know). In some implementations, smart phone biometric scanning validation capabilities such as iris or fingerprint scanning (something you are) can be leveraged to provide three factor security authentication. The smart phone version of the EvidenceKey player may allow the use of AirPlay and other similar display sharing capabilities. This enables an authorized user to display DME stored on their smart phone onto a authorized wired or wirelessly connected larger display such as a large screen display or projector in a law office, judge's chamber, or a courtroom.

In an aspect of an another implementation, the EvidenceKey is implemented on a tablet computer such as an iPad, Android, or other tablet as an app downloaded from an app store, or as an app included on a special Micro SD, CF card or other hardware device uniquely accessible by the authorized tablet. Very similar to a smart phone implementation, the tablet EvidenceKey leverages the tablet's communications, storage, display screen and audio, and/or digital rights management software included in the tablet. Like the smart phone app, the tablet version of the EvidenceKey player allows the use of AirPlay and other similar display sharing capabilities. This enables an authorized user to display DME stored on their tablet onto a authorized wired or wirelessly connected larger display such as a large screen display or projector in a law office, judge's chamber, or a courtroom.

In all cases of the USB, smart phone, tablet, and other EvidenceKey implementations, the method includes a centralized DME repository management system with evidence search, view, logging, tagging, categorizing, and chain of custody validation logic. The DME management system includes VPN host software, file transfer, audit trail logging, archival, and evidence data storage, and authorized user administration capabilities. The centralized DME management repository system can operate on a customer server within the protected boundary of the customer's enterprise network or as "cloud-based" software as a service over the Internet. So the central DME repository server software could operate on a server in a police or sheriff department data center, or it could be located as a "cloud-based" software as a service operating on one or more hosting data centers out on the Internet.

It is important to note that the present invention is not limited to only legal evidence. Many organizations and many industries currently capture integrated data streams of video, audio, images, and metadata in offices, work areas, and out in the field in the course of their business operations, or will do so in the future. Nothing in this description limits the scope of the present invention to only legal evidence data. Non-legal audio, video, images, and metadata analog and digital data capture, retention, and distribution will use the same approach, techniques, technology, and business processes to capture, view, and archive field audio, video, and image data.

In an aspect, the USB memory stick implementation could be comprised of a physical evidence storage device includes a USB interface and a unique identification number that can store encrypted video, audio, image, text, metadata, chain of custody, and other legal evidence data; and a set of applications or web browser pages stored on the USB evidence storage device that provide and control access security credential data entry, legal evidence data decryption, secure download, legal evidence data encryption, search, view, playback, and secure deletion of video, audio, image, metadata, text, and other legal evidence data.

In an aspect, a legal evidence data storage repository and server control applications can run on a file server at a customer location, or run on a hosted secure data center on the Internet commonly referred to as cloud-based storage, or run on a combination of customer-hosted and third party hosted file servers as cloud-based storage on the Internet.

In an aspect, the USB evidence storage device (memory stick) includes a physical storage device having a security access application or web browser page(s) stored on it that loads into a computer, tablet, or other electronic device through the USB connection. The video, audio, image, metadata, chain of custody, text, and other legal evidence data stored on the USB evidence storage device can only be decrypted and accessed if the unique identification number of the evidence storage device matches one of a list of valid and authorized evidence storage device ID numbers maintained on the central repository server, and after a valid set of security authentication credentials has been entered into the security application loaded from the evidence storage device running on the computer, tablet, phone, or other electronic device. The security access application generates and transmits audit trail records of every access attempt to the legal evidence data in the storage repository.

In an aspect, the EvidenceKey device includes data delete/wipe application code stored on a evidence storage device, wherein the video, audio, image, metadata, text and other legal evidence data are securely deleted from the EvidenceKey evidence storage device if invalid security authentication credentials are entered more than a specified number of attempts. All legal evidence data may also be deleted if access is attempted past the valid authorized date for an evidence storage device as maintained in an access control list on a legal evidence data storage repository server. The data delete/wipe application code may generate and store an audit trail record of every data wipe operation on the evidence storage device that is not deleted by the data wipe function. This audit trail record may be uploaded to the central repository server the next time the evidence storage device successfully connects to the central repository server, or at regular intervals while connected to the central repository server, as configured by the system administrator.

In an aspect, virtual private network (VPN) secure communications application code is stored on the evidence storage device, wherein the secure communications software on the evidence storage device can establish a secure communications channel from the evidence storage device to a central repository, wherein the central repository can be a remote repository server located on a server at the customer location or as a "cloud-based" hosted server. Secure communications channels can be used to search for, access, and download legal evidence data from the cloud-based repository storage to the evidence storage device, in a secure manner that prevents any spoofing, sniffing, or man in the middle cybersecurity attacks from disclosing the data to an unauthorized third party.

In an aspect, a legal evidence search application or web browser interface is stored on the evidence storage device, wherein a user interface application from the evidence storage device runs on a computer, tablet, phone, or other electronic screen-based device, and provides a legal evidence search capability to search for, identify, select, and—if authorized—securely download legal evidence video, audio, image, metadata, chain of custody, text, and other legal evidence data from a hosted centralized data repository to the evidence storage device. Search criteria can include some or all of legal evidence metadata—defined as evidence classification types, such as drugs, DUI, traffic stop, weapons, and other incident, misdemeanor and felony types, markers such as GPS locations and display screen button presses where the officer observed drugs, weapons, or other items tossed out of subject vehicles during a chase, officer descriptors, such as name, badge number, precinct, vehicle descriptors such as make, model, year, color, state, license plate number, subject descriptors, such as height, weight, hair color, name, address, date of birth, driver's license number, ticket descriptors, such as number, type, date, location, notes, incident address, GPS location, date and time, and other types of classification collectively known as legal evidence metadata.

In an aspect, a legal evidence data download process, includes downloading legal evidence from a legal evidence repository or master evidence management system to the evidence storage device so that the owner of the evidence storage device has a copy of the legal evidence stored on his or her evidence storage device. The user can then view and display the legal evidence data on his or her evidence storage device at most any electronic device with a USB port, on a cell phone or tablet with a screen, or wirelessly to external monitors through AirPlay and other screen sharing alternatives. This provides portability and a means to display legal evidence to attorneys, prosecutors, police officers, court clerks, judges, juries, and other authorized parties in preparation for legal motions, actions, trials, and sentencing, and to be displayed to juries and judges in court proceedings. This process avoids the need for police officers, clerical staff, and administrators to burn CD-ROM, DVD, or Blu-Ray disks for distribution and display of legal evidence. Avoiding the CD-ROM, DVD, or Blu-Ray disk burning process should significantly reduce the amount of time police officers, clerical staff, and administrators spend preparing legal evidence data for distribution to authorized parties.

In an aspect, audit trail records are generated and stored on the legal evidence repository or master evidence management system for each item of legal evidence that is viewed or accessed, along with audit metadata such as date, time, IP address, and unique identifier for the evidence storage device. This audit trail process and storage on the secure evidence storage device provides stronger control over unauthorized access to legal evidence data. In contrast, once a CD-ROM, DVD, or Blu-Ray disk is burned, there is often no control or audit trail reporting over who has viewed or has had access to the legal evidence data, and the legal evidence can be lost if the physical disk is lost or damaged.

In an aspect, a legal evidence viewer application or web browser page(s) is stored on a evidence storage device, wherein the video, audio, image, metadata, text and other legal evidence data can be displayed and played on a computer, tablet, phone, or other electronic device with a screen.

Depending upon the data classification and security credentials, the evidence may be viewed as a plain video with no metadata.

In an aspect, an audit trail reporting application is stored on a evidence storage device, wherein the audit trail application generates audit trail records of each successful and unsuccessful access attempt with date, time, IP address, user ID, password, and other audit trail data, the number of invalid access attempts with date, time, IP address, and other audit trail data and the date, time, and IP address, and other audit trail data for each secure delete/wipe of the evidence storage device caused by exceeding the maximum number of invalid access attempts, the start and stop dates and times, IP address, and other audit trail data for each communications session established through a VPN or secure communications application, identification of each legal evidence item downloaded from the hosted centralized data repository to the evidence storage device, with date, time, IP address, selection metadata, and other audit trail data, and the date, time, IP address, user ID, password, and other audit trail data documenting each time a legal evidence video, audio, image, metadata, or text object was viewed using a viewer application.

In an aspect, a legal evidence upload process include a server application, wherein legal evidence including video, audio, image, metadata, text, and other legal evidence data is uploaded to the legal evidence repository server from one or more authorized legal evidence collection servers, from legal evidence video, audio, image, and text capture systems installed in vehicles, from legal evidence capture systems at fixed locations, and from other sources and legal evidence repositories.

In an aspect, a legal evidence categorization and indexing process includes a server application for the master evidence management system or evidence repository, wherein legal evidence video, audio, image, metadata, and text can be indexed and further categorized and flagged with various categories of additional metadata that provide additional identification, categorization, search, and retrieval information about the legal evidence video, audio, image, metadata, and text.

In an aspect, a legal evidence access control process is included in a server application of the master evidence management system or evidence repository, wherein the administrator may authorize one or more evidence storage devices to have various classes of or individual access right permissions to legal evidence including video, audio, image, metadata, and text data stored in the legal data repository or master evidence management system. The access rights may grant one or more evidence storage devices permission to:
  a. Access legal evidence data on a pre-authorized need to know basis for each legal case. Access may be restricted to the USB evidence storage device, smart phone, tablet, and/or other evidence storage devices assigned to the defense attorney representing the subject, the district attorney prosecuting the case, court clerks and other clerical staff assigned to the case, judges, police officers, probation officers, counselors, and other individuals authorized to have access to the legal evidence for a specific case;
  b. An authorized evidence storage device may have access permissions to search for legal data evidence through various search criteria such as date, time, classification, vehicle ID, subject, location, officer, and other legal evidence index metadata, but only for legal evidence for cases in which the holders of the evidence storage devices are authorized to access. Alternatively the legal access control process may display or provide limited identifiers and a short description of all items found, but only authorize full view and download of evidence if the evidence storage device is authorized to download legal evidence data related to the case;
  c. Download one or more legal evidence objects—video segment, audio segment, image, text, or other legal evidence object—to the evidence storage device, according to the permissions authorized for the evidence storage device;
  d. Burn a CD-ROM, DVD, Blu-Ray, or other physical disk with legal evidence objects plus embedded player software that will enable metadata and view the legal evidence video, audio, image, metadata, and text;
  e. Burn a CD-ROM, DVD, Blu-Ray or other physical disk with video files in various commonly used video file formats such as .AVI, .WMV, .MPG2, .MPG4 and other file formats as authorized and supported by the process;
  f. Route image snapshots, text, and metadata listings to authorized printers, displays, and other output devices;
  g. Grant a permission to one or more authorized users, create a direct link to a legal evidence object result set, and electronically forward the result set to one or more authorized user(s) via email, text message, authorized social media platform, or other electronic method, so that the other authorized user can directly access the result set subject to their own permissions using the legal evidence access control process. By way of example, the police officer or court administrator may assign access permission rights to the defense attorney, prosecutor, judge, and other authorized parties to have access to all legal evidence related to a legal case. This would avoid the need for a police officer, clerk, or court administrator to have to burn a physical CD-ROM, DVD, or Blu-Ray disk of the legal evidence and arrange to have the physical CD-ROM, DVD, or Blu-Ray disk storage item transported and delivered to all relevant parties to a legal case. In this alternative, the police officer, clerk, or administrator could search for the legal evidence stored on the legal data repository or master evidence management system, and assign permission rights to the evidence storage device assigned to the attorneys, court clerks, and judges for the legal case. This assignment process may also generate emails, text messages, or other electronic communications to each of the device holders and any notification lists they choose to establish, notifying them that legal evidence for a case is assigned to them and available for download and review from their evidence storage device. Each of these notified individuals may then at a later time search for and download the evidence from the data storage repository to their assigned evidence storage device. Once downloaded to their assigned evidence storage device, they can then view the legal evidence, and may perform metadata searches if metadata searches are supported and available. These evidence storage device holders could then choose to assign the legal evidence data to other evidence storage device holders as need dictates. Audit trail records may be generated, stored, and/or uploaded for each permission assignment.
  h. Provide other authorized access to legal evidence data in the legal evidence repository or master evidence management system.

In an aspect, a categorization and indexing process, based upon the unique identification number of a evidence storage device and access permissions and legal evidence system search capability, generates an audit trail record of the search parameters for searching the legal data repository or master evidence management system.

DETAILED DESCRIPTION OF THE INVENTION

Figure 1:
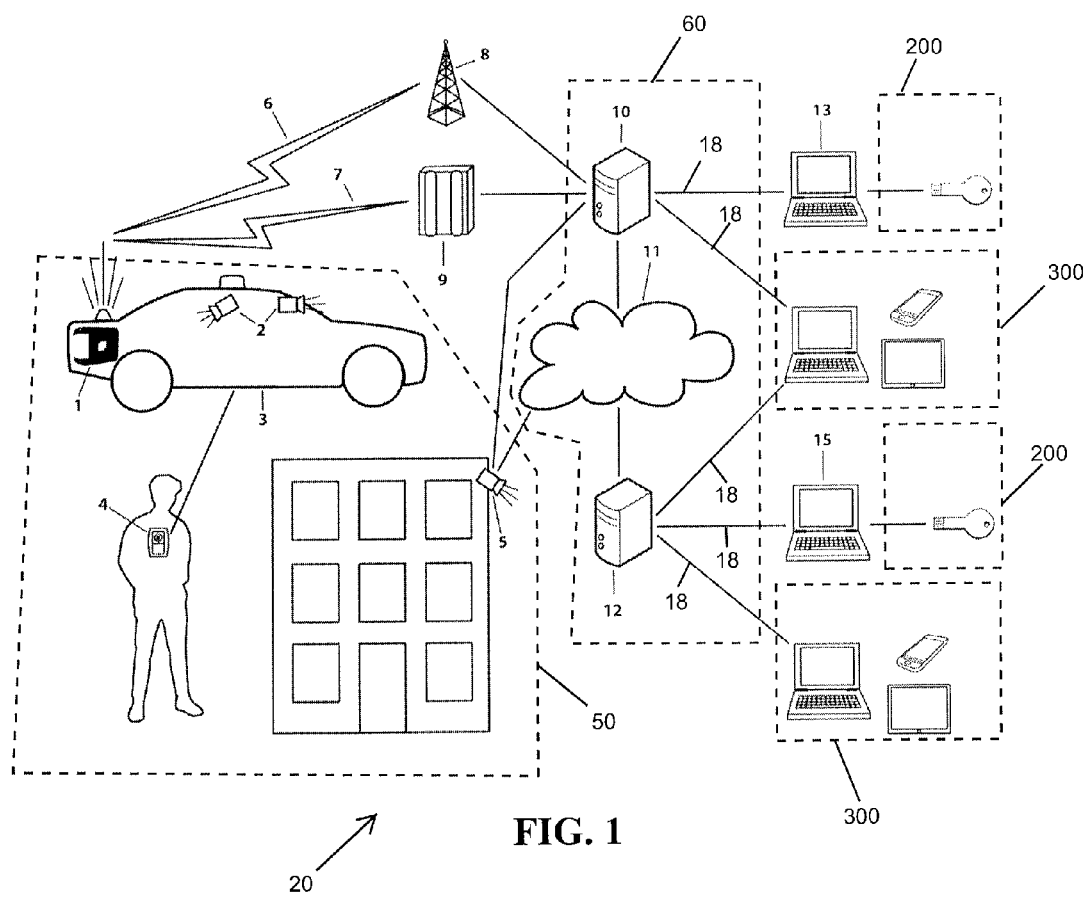
FIG. 1 is a schematic view of a DME collection and distribution system for evidence management according to an aspect of the present invention.

FIG. 1 shows a DME collection and distribution system 20. From FIG. 1, Digital Multimedia Evidence (DME), including audio evidence data, video evidence data, metadata, and other evidence data are captured in the field from a variety of mobile data recording devices 50, such as mobile audio and video camera 2 in a vehicle 3, body-worn audio and video camera 4, and fixed location audio and video camera 5. DME data recorded in a vehicle recorder, transmitter, and a router 1 is streamed in real-time via real-time communication link 6 to a DME local storage server 10 or batch uploaded via batch communication link 7 to an access point 9 and then on to the DME local storage server 10 or to a cloud-based storage server 12 over the Internet 11. The DME local storage server 10 and the cloud-based storage server 12 are collectively known as a DME management storage system 60. The DME management storage system 60 is connected to various evidence storage devices 200 or 300. The evidence storage device 200 is a USB EvidenceKey evidence storage device that may be connected to computers 13 and 15. The evidence storage devices 300 is a computing evidence storage device, such as a computer, a smart phone, a tablet, and other computing device locally or remotely connected through a secure Virtual Private Network (VPN) tunnel 18 to the DME management storage system 60. DME video data 242, DME audio data 244, and DME metadata 246 (FIG. 2) can be securely downloaded to the solid state evidence storage device, EvidenceKey 200. In addition, DME video, audio, and metadata for 452 (FIG. 4) can be securely downloaded to an EvidenceKey app and secure storage on the evidence storage device 300, such as a laptop, smart phone, tablet, or other computing device.

The present invention is a method and a system for replacing CD-ROM and DVD legal evidence disks with more secure USB EvidenceKey evidence storage devices 200, connected to a computers 13 and 15 or to a secure DME EvidenceKey application running on the evidence storage devices 300, such as a computer, smartphone, tablet, or other computing device.

The EvidenceKey DME storage device 200, with a USB, Ethernet, or other computer interface, and embedded audio, video, and metadata evidence player and VPN client software, allows secure search, viewing, and listening for video, audio, and metadata evidence, and provides secure audit trail logging and reporting of all access to the evidence data 242, 244, and 246. The USB EvidenceKey evidence storage device 200 and other format solid-state evidence data storage devices 200 have a globally unique identifier so that a unique audit trail record specifically linked to the EvidenceKey DME storage device 200 is included in the DME metadata and access audit trail records.

In a similar manner, the evidence storage device 300 including a laptop computer, a smart phone, or a tablet contains software that operates in a similar fashion to the DME storage device 200 described in the previous section. A globally unique identifier such as a MAC address of the laptop, the smart phone, or the tablet is used to positively confirm the computing device's globally unique identity in all DME metadata and access audit trail records.

Figure 2:
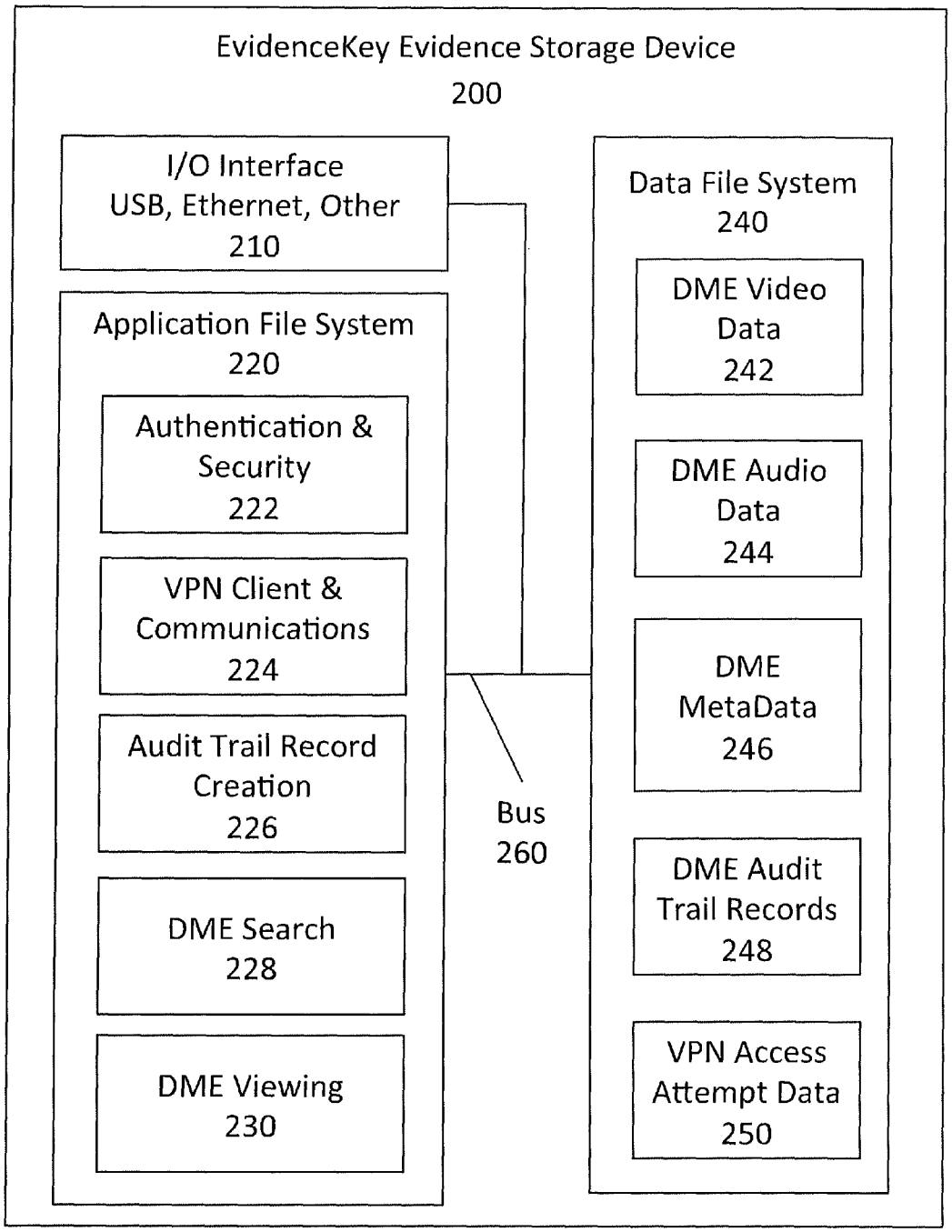
FIG. 2 is a schematic representation of a first embodiment of a secure solid-state evidence storage device, for use with the DME collection and distribution system according to an aspect of the present invention.

Referring to FIG. 2, the EvidenceKey evidence storage device 200 is a solid-state storage device. The solid-state EvidenceKey evidence storage device 200 can include one or more input/output interfaces 210 that allow connection to various devices, including, but not limited to, computers 13 and 15. The I/O interfaces 210 can include, but are not limited to, USB ports, Ethernet ports, or other computer interfaces. The solid-state EvidenceKey evidence storage device 200 includes a data file system 240.

The solid-state EvidenceKey evidence storage device 200 in FIG. 2 also includes one or more software applications in an application file system 220. The application file system 220 may be stored in a random access memory (RAM) or read only memory (ROM). Application file system 220 may be located in a separate partition on the evidence storage device 200 that is read-only and cannot be modified by the EvidenceKey user. The software applications 220 can include various DME media player software, such as DME viewing application 230, capable of accessing and utilizing embedded audio data, video data, metadata, and other file types. The DME evidence player software, DME viewing application 230, will run from the secure evidence storage device 200, so that no software needs to reside on, or be pre-installed on the computing devices 13 and 15 in FIG. 1. The software applications 220 includes the following applications: authentication and security application 222, VPN client and communications application 224, audit trail record creation application 226, DME search application 228, and DME viewing application 230, as shown in FIG. 2.

The solid-state evidence storage device 200 in FIG. 2 also stores DME data file system 240 accessible by the various EvidenceKey software applications in the application file system 220. The integrated DME data stream may include stored evidence files, such as DME video data files 242, DME audio data files 244, DME metadata data files 246, DME audit trail record files 248, and access attempt data 250. This DME evidence data 242, 244, and 246 can only come from the DME management storage system 60, discussed further below. The file system 240 is random access read/write memory (RAM). Evidence data 242, 244, and 246 stored on the solid-state EvidenceKey evidence storage device 200 may be any type of retrievable DME data. The DME data may be stored in a wide variety of flat files or databases. The data file system 240 may include relational databases, including, but not limited to, Microsoft Access and SQL Server, MySQL, INGRES, DB2, INFORMIX, Oracle, PostgreSQL, Sybase 11, Linux data storage, network databases, as well as flat data files.

In an aspect, in FIG. 2 the VPN client and communications application 222 creates VPN login access attempt audit trail records and stores them in the VPN access attempt data file 250. Periodically these VPN access attempt audit trail records are uploaded to the DME management storage system 60 in order to provide centralized audit trail research and reporting capability to identify and report which EvidenceKey users established or attempted to establish a VPN connection to the central EvidenceKey DME management storage system 60. The audit trail record will include the specifics of the successful or unsuccessful establishment of a VPN session, including start date and time, end date and time, IP address of the device and server, and EvidenceKey user identifier information.

In an aspect, in FIG. 2 the audit trail record creation application 226 will create audit trail records about which DME file was accessed by the EvidenceKey user, and when that access occurred. The access audit trail records will be stored in the DME audit trail records file 248. Periodically these DME access audit trail records will be uploaded to DME management storage system 60 in order to provide centralized audit trail research and reporting capability to identify and report which EvidenceKey users accessed specific DME files. The DME access audit trail record file 248 will contain the specifics of the DME access, including DME object identifiers, start date and time, end date and time, IP address of the device, and EvidenceKey user identifier information.

In an aspect, in FIG. 2 the solid state evidence storage device 200 may be configured to only store program files and evidence data, relying on the other devices with which it connects to provide the needed user interface and processing means. In an example of such an aspect, the solid-state EvidenceKey evidence storage device 200 can comprise a USB memory stick, with a USB interface connector composed of four contact stripes and a memory chip of up to 64 GB of data storage, only storing program files and data. In such an example, the user interfaces, such as the keyboard and screen, a network adapter, and processor are all in the laptop or computer 13 or 15 into which the USB EvidenceKey evidence storage device 200 is plugged. No processor, network interface, battery or other power source, user interface such as a screen and keyboard are part of the solid-state EvidenceKey evidence storage device 200.

In an aspect, in FIG. 2 it is important to note that the EvidenceKey evidence storage device 200 will provide tight controls over the security and confidentiality of DME data. DME data stored in the data file system 240 can only be added or deleted through the application programs included in the application file system 220. Data in the data file system area 240 will be encapsulated and encrypted so that the DME data is encrypted when added to the evidence storage device 200, and is un-encapsulated and decrypted only when the DME data is viewed by the DME viewing application 230 included in the application file system 220. This will protect the security of the DME data, and will ensure that all DME data access is logged in and stored in the DME audit trail records file 248.

In FIG. 2, before any of the DME search application 228 and the DME viewing application 230 are called, the authentication and security application 222 is called, which carries out a two-factor security authentication process. The user must have physical possession of the evidence storage device 200 that is plugged into a port on a host computer 13 or 15, and must be able to correctly enter the security credentials into the authentication and security application 222. Once that authentication sequence has been successfully completed, the DME search application 228 and the DME viewing application 230 are available to the EvidenceKey user. The DME search application 228 allows the user to search metadata 246 for DME data of interest. Once the DME data of interest is identified, the DME viewing application 230 will decrypt and play the integrated data stream of synchronized video data 242, audio data 244, and metadata 246.S In some embodiments of the EvidenceKey evidence storage device 200 in FIG. 2, or other storage devices, the multi-factor authentication and security application 222 utilizes a third biometrics factor such as a finger print reader swipe or contact reader, camera with facial, iris, or retina recognition software, handprint points scanner and recognition software, or other biometrics security technique can be incorporated into the computers 13 and 15. The addition of a biometrics scanning capability could provide three factor security authentication: (1) Something you know—e.g., a password; (2) Something you have—e.g., the EvidenceKey; and (3) Something you uniquely are—e.g., a fingerprint, iris or retina pattern, or collection of facial or handprint points. Similarly, 802.X Radius authentication software can be embedded on the evidence storage device 200 as part of the authentication and security application 222 to add radius authentication before DME data can be viewed from the evidence storage device 200. Other forms of security authentication can also be included in the evidence storage device 200 to ensure confidentiality and integrity of the DME video data 242, audio data 244, metadata 246, or other data files stored on storage device 200.

In FIG. 2, each time the DME viewing application 230 runs on a personal computer 13 or 15, the audit trail record creation application 226 creates a time and date-stamped audit trail record that includes a MAC address from the personal computer 13 or 15, and a list of each DME data file 242, 244, or 246 accessed through the DME viewing application 230. The audit trail records 248 may include details about what evidence data segments were displayed by the viewing application 230, based upon DME metadata 246 tags and other information. The access audit trail records 248 may be permanently archived on the evidence storage device 200, so there is a full and complete audit trail of every evidence file that has ever been stored on the evidence storage device 200, when an evidence file was accessed, and by what computer 13 or 15. Furthermore, the audit trail records 248 may also be uploaded to the DME management storage system 60, including servers 10 and 12 when the EvidenceKey evidence storage device 200 has Internet connectivity through computer 13 or 15, so that the DME audit trail records 248 are also available for review and reporting from DME management storage system 60. The DME viewing application 230 may also allow an authorized user to display a list of all access audit trail records 248 on the screen of personal computer 13 or 15.

In FIG. 2, other DME data may include business rules and data for expiration dates for DME video data 242, DME audio data 244, and DME metadata 246. A DME data file may be tagged with a date and time after which the DME may not be viewed by the DME viewing application 230, and/or is securely deleted by the authentication and security application 230 from the EvidenceKey evidence storage device 200. DME metadata 246 may also include counter data, where an evidence file can only be accessed by the viewing application 230 a limited number of times before expiring, and/or is securely deleted by the authentication and security application 230 from the EvidenceKey storage device 200. The DME metadata 246 may also include other expiration parameters for the evidence data, such that the evidence data will be securely deleted from the EvidenceKey evidence storage device 200 by the authentication and security application 222, or otherwise is no longer accessible from the EvidenceKey evidence storage device 200 even by an authorized user with valid access security credentials.

The EvidenceKey authentication and security application 222 in FIG. 2 may also include a failed login security protocol. Once the allowed number of failed logins is exceeded, the authentication and security application 222 automatically logs the authentication failures, and then automatically performs a secure wipe of all evidence data on the EvidenceKey evidence storage device 200 including at least DME data file system 240 files 242, 244, and 246. The EvidenceKey evidence storage device 200 then has to be re-authorized before any DME data is downloaded to the DME data file system 240 files 242, 244, and 246.

The EvidenceKey evidence storage device 200 in FIG. 2 may also include a messaging function in the VPN client and communications application 224. A messaging capability allows a user to save the results of from the DME search application 228, and create emails, text messages, or other message types to notify other EvidenceKey users of DME data that the user determines to be of interest. The user can add instructions, comments, links, and other information to a message, and forward the message to his or her own email addresses for reference and archival, and/or to other relevant parties whenever the EvidenceKey evidence storage device 200 is attached to a computer 13 or 15 with a live connection to the Internet. For example, a police officer may notify court clerks, defense attorneys, prosecutors, and other parties of the availability of DME for a case such as a DUI stop, and the DME search criteria used to get the DME from the DME management storage system 60. Each of the message recipients may then download the evidence as they see fit to their own EvidenceKey evidence storage device 200, avoiding the need for the police officer or police administrator to spend time and money burning CD-ROM, DVD, or Blu-Ray disks, and transporting the physical disks to the intended recipients. Authorized users therefore may use the messaging capability of the EvidenceKey evidence storage device 200 to facilitate the secure distribution of legal evidence to authorized parties at low cost. If the message recipient felt the need to burn a CD-ROM, DVD, or Blu-Ray physical disk of the evidence, he or she could choose to do so at a time of his or her convenience. Audit trail records 248 may be generated for each message so that an audit trail exists of messaging communications about legal evidence data.

Figure 3:
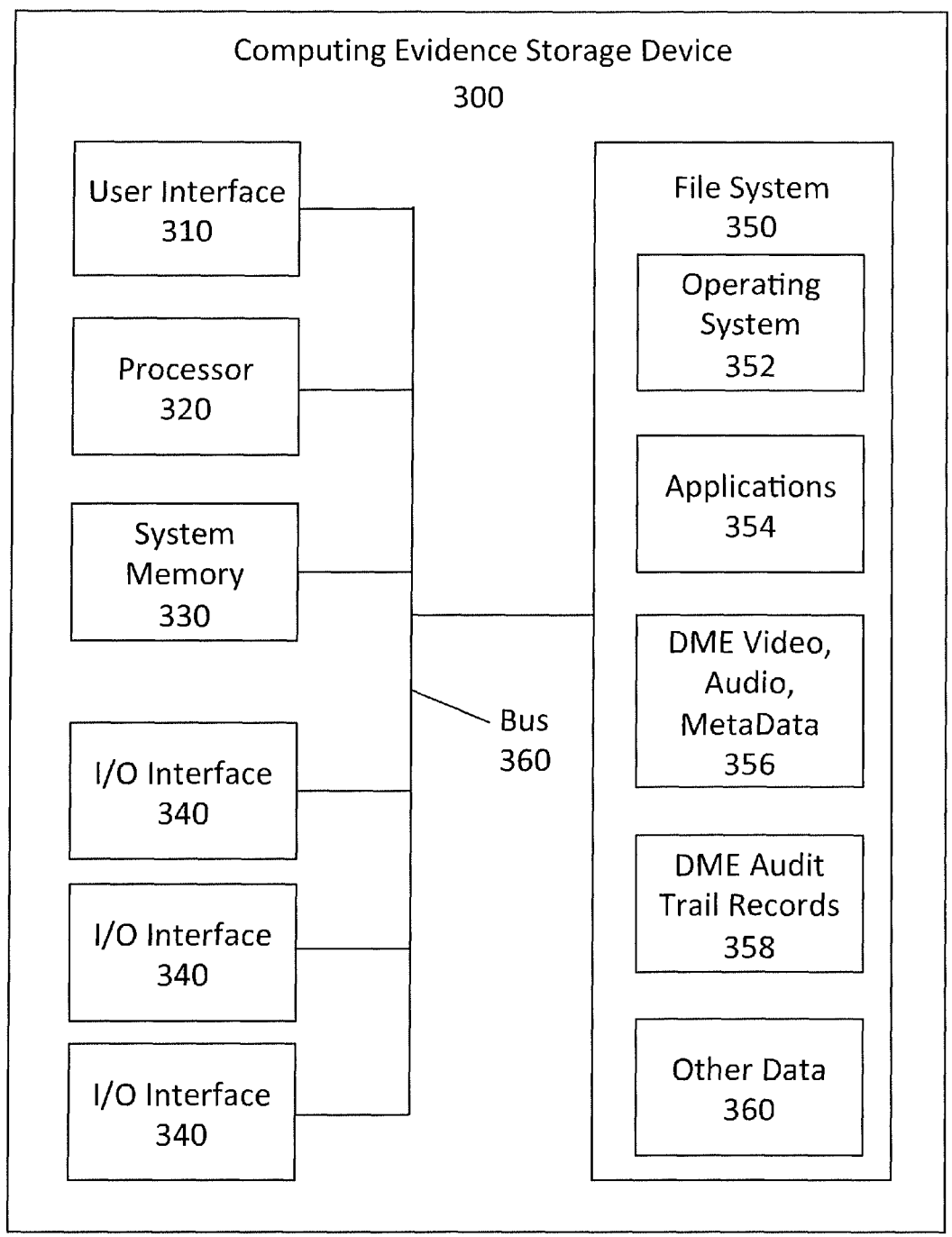
FIG. 3 is a schematic representation second embodiment of an evidence storage device for use with the DME collection and distribution system according to an aspect of the present invention.

In an aspect, an alternative implementation of a computing evidence storage device 300 is shown in FIG. 3. In this alternative implementation, a set of EvidenceKey DME application software runs on a DME access computer, smartphone, or tablet, or other computing evidence storage device 300. The computing evidence storage device 300 includes a system bus 360 that connects various components in computer evidence storage device 300. In an aspect, the computing evidence storage device 300 is configured to include a user interface 310, one or more processors 320, a system memory 330, and a plurality of input/output interfaces 340 that allow the computing evidence storage device 300 to be connected to other devices. The system bus 360 connects the user interface 310, the processor 320, the system memory 330, and the I/O interfaces 340 to the data storage file system 350. The file system 350 provides indexing, control, access, and messaging to various types of operating system files 352, application files 354, encrypted DME video data, audio data, and metadata files 356, DME access audit trail records 358, and other data 360. In all aspects, the business functions, security, access, messaging, and audit trail logging processes mirror these same capabilities as provided in the DME EvidenceKey evidence storage device 200, and the descriptions of the features and capabilities of the DME EvidenceKey evidence storage device 200 described in prior paragraphs.

Figure 4:
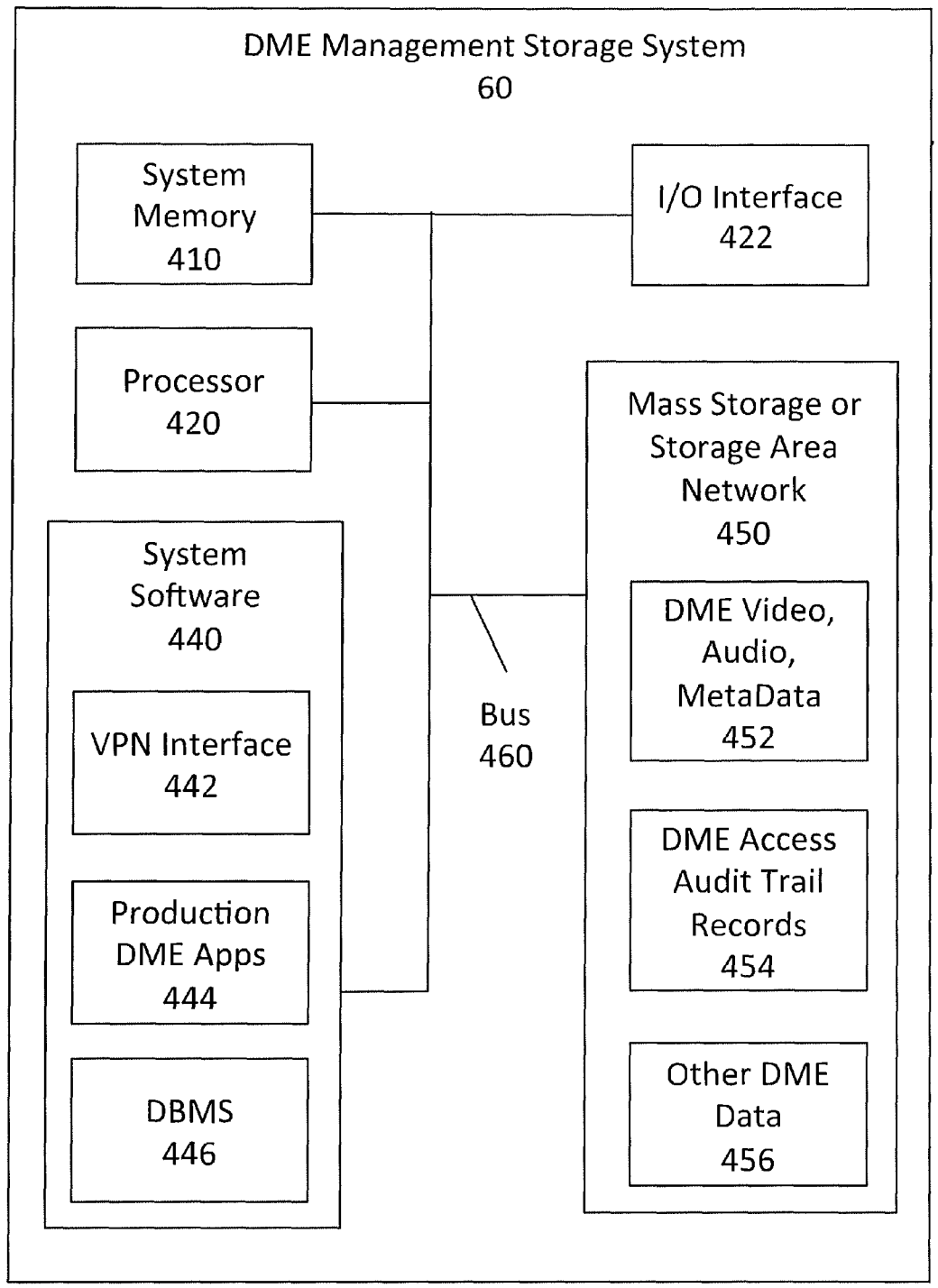
FIG. 4 is a schematic representation of a DME management storage system for use with the DME collection and distribution system according to an aspect of the present invention.

In FIG. 4, a master DME management storage system 60 controls search, archiving, retention, and transfer of evidence data from the DME management storage system system 60 to individual EvidenceKey evidence storage devices 200 or to individual computing evidence storage devices 300. As shown in FIG. 1, the EvidenceKey evidence collection and distribution system 20 includes the DME management storage system 60. In the embodiment of the present invention shown in FIG. 1, the DME management storage system 60 may be one or more local enterprise DME local storage servers 10, and/or offsite DME cloud-based storage servers 12 connected to the enterprise over the Internet 11. Referring to FIG. 4, the DME management storage system 60 may have several production DME applications 444, discussed in more detail below. The DME management storage system 60 and its production DME applications 444 in FIG. 4 may utilize elements and/or modules of several nodes or servers 10 and 12. In any event, the DME management storage system 60 in FIG. 4 should be construed as inclusive of multiple modules, software applications, servers and other components, as indicated in FIG. 1 with respect to DME management storage system 60.

The DME management storage system 60 in FIG. 4 includes its own system memory 410, which stores the system software 440 and various production DME applications 444. The system software 440 may also include a VPN interface application 442 and database management software (DBMS system application) 446. The DME management storage system 60 may include a mass storage device or storage area network 450. The DME mass storage device 450 is configured to store the data files originating from the FIG. 1 data recording devices 50. In addition, the DME mass storage device 450 can be used for storing computer code, computer readable instructions, program modules, various databases, and other data for the DME management storage system 60. The mass storage device 450 may include one or more hard disk drives, possibly in various configurations of RAID 5, RAID 10, or other levels of RAID redundancy, various magnetic storage devices such as magnetic cassettes, tape drives, solid-state hard drives, solid-state flash drives, CD-ROM disks, DVD disks, or Blu-Ray disks, or other magnetic storage, spinning hard drive storage, solid-state hard drive storage, optical storage, random access memories, storage area networks, and other means of storing computer readable data.

The DME management storage system 60 in FIG. 4 may include a system bus 460 that connects various components of the system memory 410, processor(s) 420, system software 440, and to the mass storage device 450. The bus 460 also connects to an input/output interface 422 configured to communicate with other devices and networks. The I/O Interface 422 can communicate over various networks, including, but not limited to local area networks (LAN) or a wide area networks (WAN). The network(s) may include, but are not limited to, local 100 MB or 1 GB local area networks, T1, T3/DS3, SONET Ring, Frame relay, ATM, or other wide area, wired, microwave, or wireless networks.

In an aspect, the DME management storage system 60 in FIG. 4 is an evidence repository. In FIG. 1, the evidence repository may reside on a computer and/or local storage server 10 located within the protected boundary of the public safety agency enterprise, may be delivered as a secure "cloud-based service" over the Internet by means of the cloud-based storage server 12, or a combination of the two. A "cloud-based service" means the evidence data repository is located on the cloud-based server 12 in FIG. 1 that is a data storage facility located outside the boundaries of the public safety agency enterprise.

In an aspect, in FIG. 1, the DME management storage system 60 (including local storage server 10 and cloud-based storage server 12) transfers DME audio data, video data, and metadata to an end user of the EvidenceKey evidence storage device 200 and maintains complete audit trail records of what evidence data is transferred to the EvidenceKey evidence storage device 200. In FIG. 4, the DME access audit trail data 454 may include the evidence file transfer date, time, file size, hash control metadata, and MAC address of the server 10 or 12 as well as the computer credentials such as IP address, MAC address, and software serial number, user ID, and other unique identifier information found on computing devices 13 and 15 into which the EvidenceKey evidence storage device 200 is plugged, and as shown in FIG. 2, the security credentials of the EvidenceKey evidence storage device 200. In an aspect, the DME management storage system 60 on FIG. 4 can call on one of its production DME applications 444, such as an audit tracking application, to create and store access audit trail records 454. In another aspect, in FIG. 4 the audit tracking application of production DME applications 444 of the DME management storage system 60 can call on the audit trail record creation application 226 in FIG. 2 of the EvidenceKey evidence storage device 200 to provide audit trail information to the user of the EvidenceKey evidence storage device 200. Likewise, the audit tracking application of the production DME applications 444 of the DME management storage system 600 in FIG. 4 can call on an audit trail application of the applications 354 on computing device 300 in FIG. 3 to provide audit trail information to the user of the EvidenceKey evidence storage device 200.

In an aspect, on FIG. 1, DME data is loaded onto an EvidenceKey evidence storage device 200 by the DME management storage system 60 by means of the computer 13 or 15. In an aspect, the DME management storage system 60 uses a verification application of the production DME applications 444 as shown on FIG. 4 to ensure that the user of the EvidenceKey evidence storage device 300 is an authorized user.

In an aspect, on FIG. 2 the EvidenceKey evidence storage device 200 includes the embedded VPN client and communications application 224 with a minimum of AES 128 bit encryption, or more secure VPN protocols as security protocols evolve over time. In FIG. 1, the EvidenceKey evidence storage device 200 connected to a computer 13 or 15 with Internet access will use the VPN client and communications application 224 to establish a secure Virtual Private Network tunnel 18 with the DME management storage system 60. In FIG. 1, the DME management storage system 60 (including servers 10 and 12) will validate the security credentials presented by the EvidenceKey evidence storage device 200. In FIG. 1, all DME file transfers from the DME management storage system 60 to the EvidenceKey evidence storage device 200 will go through the VPN tunnel 18. This ensures there is no possibility that evidence data is transferred unencrypted "in the clear" from the DME management storage system 60 to the EvidenceKey evidence storage device 200 or other storage device.

In FIG. 1, audio data, video data, metadata, and other DME data is captured in the field from a variety of vehicle, wearable, and fixed location microphone and video cameras 2, 4, and 5, i.e. the data recording devices 50. DME data can be streamed or connected to the vehicle router 1 installed in the vehicle 3. Evidence can also be streamed or forwarded directly from the fixed location audio and video camera 5 to the local storage server 10 of the DME management storage system 60. The vehicle router 1 can connect through the cellular wireless connection 6 to a cell tower 8, through an 802.11x wireless link 7 to a yard access point 9, or be directly hardwired through an Ethernet, USB, fiber optic, or other physical cable to a yard access point 9, and then across public and private networks 6 and 7 to a local enterprise DME storage server 10. DME video data, audio data, metadata, and access control audit trail records are also batch uploaded via links 6, and 7 to a local enterprise management storage server 10 or to a cloud-based evidence management storage server 12 over public networks 11.

As shown in FIG. 1, wireless vehicle router 1 can be used with the data recording devices 50. Examples of the wireless vehicle router 1 include, but are not limited to, laptop computers, specialized wireless vehicle routers (e.g., Utility Associates Rocket™, Sierra Wireless GX440, and wireless vehicle routers by InMotion and BlueTree), and general purpose WiFi devices such as a Novatel Wireless MiFi device. In some embodiments of the present invention, the vehicle wireless router 1 also is configured to connect to data recording devices 50, such as mobile audio and video cameras 2 and 4, discussed in more details below. In addition, the wireless vehicle router 1 is configured to successfully operate in both mobile and stationary instances. For example, the wireless vehicle router 1 may be permanently mounted inside the field vehicle 3 utilized by in-the-field operations staff, and must be able to perform the functions described below while the field vehicle 3 is in motion and stationary. The vehicle wireless router 1 may include a combination of different components and may be configured to operate in a number of different manners.

Figure 5:
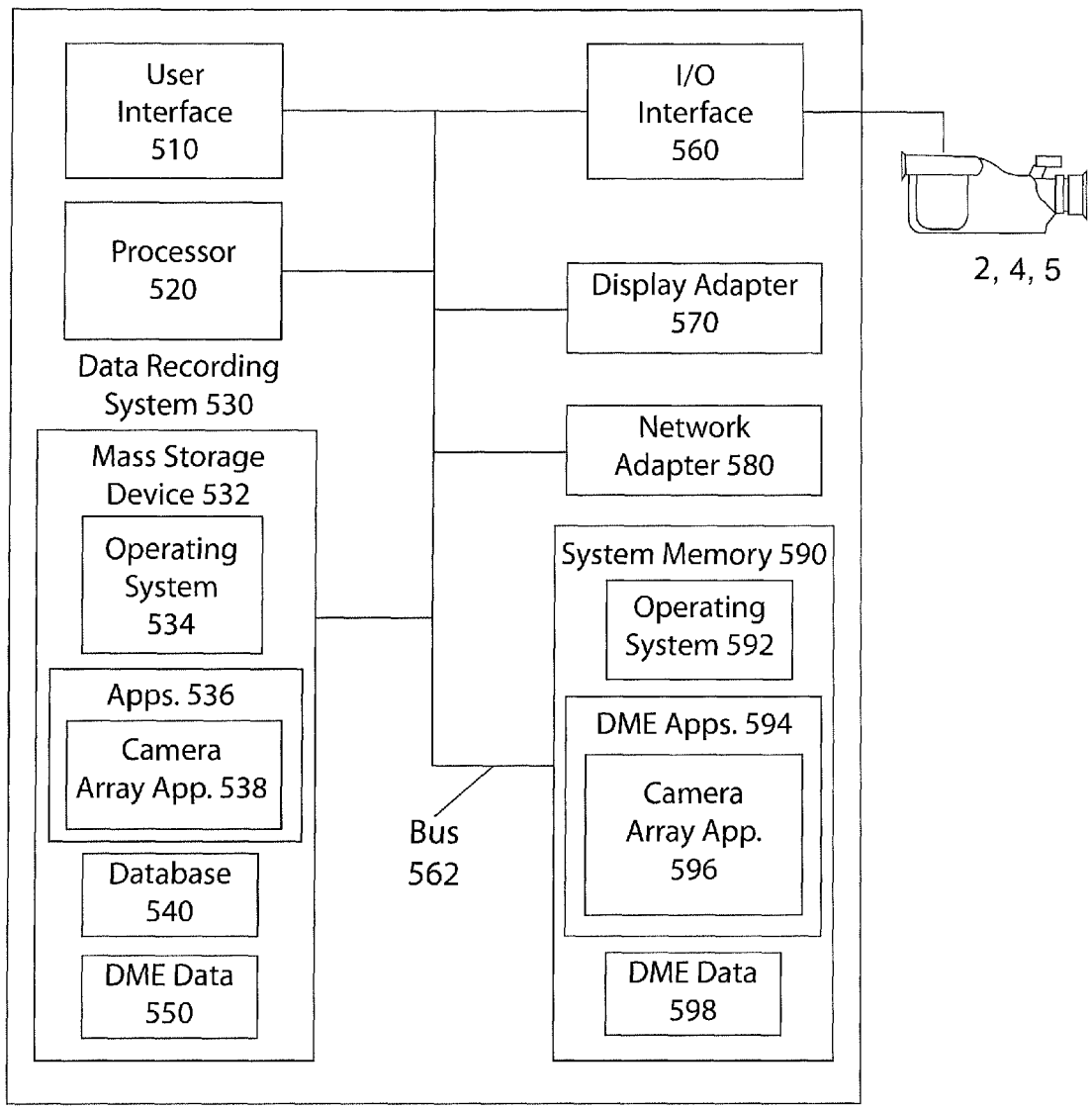
FIG. 5 is a schematic representation of a DME data recording device for the DME collection and distribution system according to an aspect of the present invention.

Referring to FIGS. 1 and 5, the evidence collection and distribution system 20 may include data recording devices 50. The data recording devices 50 are utilized to capture various types of DME data. The data recording devices 50, include mobile audio and video camera 2 to assist in the capture of the data. However, the recording devices 50 utilized by the evidence collection and distribution system 20 may include, but are not limited to, cameras, microphones, and other similar video, voice, image, text, and data-capturing devices.

The data recording device 50 in FIG. 5 may include a user interface 510, a processor 520, system memory 590 configured to store an operating system 592 and various software applications 594, including a camera array application 596 to support multiple audio and video cameras 2, 4, and 5. The data recording devices 50 may also include DME configuration data 598 that is accessible by the software applications 594. The data recording device 50 may include a DME data recording system 530 that includes one or more mass storage devices 532. The mass storage device 532 is configured to store DME data files captured by the audio and video cameras 2, 4, and 5. The hours of storage capacity of the mass storage device 532 can vary based upon the type and recorded length times of DME data captured by the audio and video cameras 2, 4, and 5. For example, mass storage devices 512 for data recording device 50 utilizing standard resolution, high definition resolution, or combination resolution video cameras 2 may have data storage capacities ranging from 4 GB to 512 GB, or more, which accommodate the large amount of data from video recordings. Two hours of standard resolution recording time can often equal approximately two gigabytes of data. High definition resolution video files can be several times larger than standard resolution.

In addition, the mass storage device 532 in FIG. 5 can be used for storing operating system 534, camera array applications 538, various databases 540, and other DME data 550 for the data recording device 50. The mass storage device 532 can be used to back up or alternatively to run the operating system 592 and/or other software applications 594. The mass storage device 532 typically is a solid-state hard drive, but may include a spinning hard disk, various magnetic storage devices such as magnetic cassettes or disks, solid-state flash drives, CD-ROM, DVDs or other optical storage, random access memories, and the like.

In FIG. 5, the data recording device 50 includes a system bus 562 that connects various components of the data recording devices 50 to the system memory 590 and to the mass storage device 532, as well as to each other. Other components of the data recording device 50 may include one or more processors or processing units 520, a user interface 510, and an input/output interface 560 to which the audio and video cameras 2, 4, and 5 may connect. In addition, the data recording device 50 may include a network adapter 580 that is configured to communicate with other devices over various networks. The network adapter 580 may be configured to connect to the vehicle wireless router 1, to the cellular network 8, to a wired connection such as a LAN or other wired connection, and to the Internet 11 as shown on FIG. 1. In addition, data recording device 50 may include a display adapter 570 that communicates with an external display device, such as a computer monitor, tablet, laptop, or other similar devices that can present images, video, and text in various formats. A system administrator can interact with the data recording device 50 through one or more input devices (not shown), which can include, but are not limited to, a keyboard, a mouse, a touch-screen, a microphone, a scanner, a joystick, voice recognition, and the like, via the user interface 510, or through the data recording audio and video cameras 2, 4, and 5.

From various computers 13 and 15, locally or remotely connected to a DME management storage system 60 (servers 10 and 12 in FIG. 1), DME data is downloaded to EvidenceKey evidence storage devices 200. Once the evidence is securely and reliably downloaded to the EvidenceKey evidence storage device 200, the evidence is available to the person in possession of the EvidenceKey 200 to search for and view selected DME data, as long as the user knows the login user ID and password associated with that specific EvidenceKey 200. The DME search application 228 allows search access using the metadata 246 associated with the evidence, such as incident type (DUI, traffic stop, accident, etc.), officer information, subject information, vehicle information, event information, date and time, location, and other metadata 246 that may be stored along with the video evidence 242 and audio evidence 244.

From FIG. 1, once the end user has selected and successfully downloaded authorized DME from the DME server 10 or 12 to the EvidenceKey evidence storage device 200, the end user can insert the EvidenceKey evidence storage device 200 into a computer USB, Ethernet, or other port of computer 13, or 15 whenever the user desires to search and view DME data, without requiring a live connection to the Internet 11. From FIG. 2, the EvidenceKey authentication and security firmware application 222 starts up on the computer 13, or 15. The end user enters the appropriate login security credentials. If successfully logged in, the user is presented with a menu page and an interface to the DME search application 228 to search for and to select DME data of interest. The end user searches for and finds the DME data of interest, with a user interface link directly to DME files of interest. The DME viewer application 230 allows the user to see markers and other metadata entries about the DME data, allowing the user to jump directly to the DME data segment of interest.

In FIG. 2, the EvidenceKey evidence storage device 200 logs all access attempt metadata through the audit trail record creation application 226, and uploads all access log data to the DME management storage system 60, whenever the EvidenceKey evidence storage device 200 has live network access.

In FIG. 2, if the user fails to login into the system correctly, after a set number of failed login attempts, the authentication and security application 222 on the EvidenceKey evidence storage device 200 may automatically perform a secure wipe of the DME data 242, 244, and 246. The EvidenceKey evidence storage device 200 then has to be re-authorized before DME data 242, 244, and 246 can be reloaded from the DME management storage system 60.

From FIG. 1, once the end user has selected and successfully downloaded authorized DME data from the DME server 10 or 12 to the EvidenceKey evidence storage devices 300, the end user can then search and view DME, without requiring a live connection to the Internet 11. From FIG. 3, the EvidenceKey authentication and security application 354 starts up on computing evidence storage device 300. The end user enters the appropriate login security credentials. If successfully logged in, the user is presented with a menu page and an interface for a DME search application that is one of the applications 354 to search for and to select DME data of interest. The end user searches for and finds the DME data of interest, with a user interface link directly to DME files of interest. A DME viewer application that is one of applications 354 allows the user to see markers and other metadata entries about the DME data, allowing the user to jump directly to the DME data segment of interest.

In FIG. 3, the EvidenceKey computing evidence storage device 300 logs all access attempt metadata through the audit trail record creation application that is one of the applications 354, and stores the audit trail records in the DME audit trail records storage area 358. The EvidenceKey computing evidence storage device 300 uploads all access audit trail log records 358 to the DME management storage system 60, whenever the EvidenceKey computing evidence storage device 300 has live network access.

In FIG. 3, if the user fails to login into the EvidenceKey computing evidence device 300 correctly, after a set number of failed login attempts, an authentication and security application that is one of the applications 354 on the EvidenceKey computing evidence storage device 300 may automatically perform a secure wipe of the DME video data, audio data, and metadata 356. The EvidenceKey computing evidence storage device 300 then has to be re-authorized before DME data 356 can be reloaded from the DME management storage system 60.

Advantages of the Present Invention

The advantages of the present invention are a minimum of two-factor security authentication, and portable and reliable access to sensitive Digital MultiMedia Evidence (DME) that does not require a real-time login to the Internet, or any file transfer delay in playing DME. The system uses portable USB EvidenceKeys, or computing devices such as smart phones, tablets, and/or computers that the user already has. This system eliminates the need to "burn" CD, DVD, or Blu-Ray disks to distribute DME.

Furthermore, the distribution of DME can be controlled and limited to authorized users, with comprehensive audit trail data capture and reporting of who accessed what DME when. To the extent that the viewing device has real-time GPS position data that is accessible to the EvidenceKey application software, that audit trail records can also show location where the DME was viewed.

A minimum of two-factor security authentication is provided—a user ID and login (something you know) and a globally unique hardware ID number in a USB data stick, smart phone, tablet or laptop (something you have). Three-factor security authentication is possible by adding biometrics security—fingerprint, Iris scan, facial point scan, etc. (something you are)—to the USB data stick application or smart phone biometrics security access. In contrast, a simple one-factor authentication of a user ID and password entered into a web browser page is inherently not secure, because access login credentials can be shared or stolen, or hacked through password cracker and other hacking tools. An unauthorized user with a valid login and password could log into a one-factor security authentication cloud-based repository and access DME from any computer, smart phone, or tablet web browser on the internet from most anywhere in the world. Which means there would be no reliable audit trail reporting of who accessed the DME, or from what device they accessed the DME. Two-factor security authentication access control and audit trail reporting for DME is much more secure and access reporting is much more reliable.

DME is automatically securely wiped if the login attempt count is exceeded. So DME may be deleted if an unauthorized user attempts to access DME on a lost or stolen EvidenceKey device.

The embedded viewer software provides access to DME metadata that is not available on CD-ROM, DVD, and Blu-Ray-based systems that just burn the video and audio to the disk. So with the EvidenceKey, an authorized user is able to search for, play, and display DME based upon all the metadata collected along with the audio and video files. An authorized user is also able to share DME metadata search criteria, so they can direct other authorized users how to go directly to the DME deemed to be relevant for review. As an example, a defense attorney could provide a metadata search reference to a specific video and audio segment for the judge, court clerk, and prosecutor as part of discovery and evidence inventory related to a legal claim or point of reference.

The present invention provides portable access to all forms of evidence data on a broad range of computers that does not require an active internet connection to search, view, and display DME, unless 802.X Radius security authentication is included in the configuration. DME is stored on the USB storage device, smart phone, tablet, or laptop in secure closed format, and is not accessible if the device is lost or stolen. DME can be made available for a limited date range and/or a limited number of views, and then securely wiped from the storage device after the date or number of times viewed respectively. The EvidenceKey or other storage device form factor is more rugged than CD-ROM or DVD disks, and is more compact and easier to carry. With a smart phone, tablet, or laptop, there is no additional device to carry.

The speed of data transfer from the vehicle DME recorder to a portable storage device can be dramatically faster than "burning" a CD or DVD, which reduces police officer and clerical time required to make and distribute copies of the DME. Eliminating clerical/police officer time to burn CD/DVD disks, eliminating the purchase of blank disks, purchasing and supporting disk burning computers and robots, and eliminating the manual distribution of CD/DVD disks dramatically reduces the cost of evidence distribution. Remote access into the DME management storage system allows district attorneys, prosecutors, judges, court staff, and other authorized parties to directly access and download evidence data to their authorized EvidenceKey device, and eliminate the entire CD-ROM/DVD/Blu-Ray burning and disk distribution elapsed time. DME can be securely available to authorized users whether they have a live Internet connection or not at the moment they want to search for and view DME.

As a result, DME is secure yet accessible without real-time Internet access, end users have access to DME metadata in addition to video and audio, the cost of blank disks and disk burning clerical time is eliminated, clerks and police officers no longer have to spend time burning evidence disks, and the court system gets complete audit trail reporting of who accessed DME, when they accessed it, and in many cases where they accessed it.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention. To the extent necessary to understand or complete the disclosure of the present invention, all publications, patents, and patent applications mentioned herein are expressly incorporated by reference therein to the same extent as though each were individually so incorporated. Having thus described exemplary embodiments of the present invention, those skilled in the art will appreciate that the within disclosures are exemplary only and that various other alternatives, adaptations, and modifications may be made within the scope of the present invention. Accordingly, the present invention is not limited to the specific embodiments as illustrated herein, but is only limited by the following claims.

We claim:

1. A secure data collection and distribution system comprising:
   a. a data recording system including:
      i. a data recording device for capturing data; and
      ii. a network adapter for transmitting the data from the data recording device, via a first communication link, to a management storage system;
   b. the management storage system including:
      i. a management storage system input/output interface for receiving the data via the first communication link from the data recording device and for delivering the data to a data storage device via a second communication link;
      ii. a management storage memory for storing the data;
      iii. a management storage processor for controlling the operation of the management storage system to ensure that the integrity of the data, as recorded by the data recording device, is maintained; and
      iv. a verification module configured for verifying access to the data by the data storage device; and
   c. the data storage device, something a user has, for receiving data from the management storage system including:
      i. a data storage device input/output interface for receiving the data via the second communication link from the management storage system;
      ii. a data storage device memory for storing the data and software modules;
      iii. an authentication and security module stored in the data storage device memory and configured to communicate via the second communication link with the verification module of the management storage system in order to allow the data storage device to have access to the data in the management storage system wherein the verification module of the management storage system checks the validity of credentials of the user of the data storage device, the credentials being something the user knows and that the user supplies to the verification module of the management storage system, and wherein the verification module of the management storage system checks for the existence of a permanent unique identifier associated with the data storage device and supplied by the data storage device to the verification module of the management storage system, and based on checking the user credentials and the existence of the permanent unique identifier associated with the data storage device, the verification module determines whether the data storage device is entitled to receive a portion of the data and to thereby ensure the integrity of the data, wherein the data is multimedia data including image data, audio data, and metadata and the data storage device further includes an audit trail record creation module configured to create an audit trail record for the data stored in the data storage device memory, the audit trail record including information about the circumstances under which the data is accessed from the data storage device, and wherein the audit trail is stored in the data storage device memory.

2. The data management system of claim 1, wherein the data storage device further includes a data storage device processor for controlling the operation of the data storage device.

3. The data management system of claim 1, wherein the data storage device further includes a viewer module for displaying the data.

4. The data management system of claim 1, wherein the authentication and security module is configured to erase the data storage device memory if the user's credentials or the unique identifier are not valid.

5. The data management system of claim 1, wherein the data storage device further includes a virtual private network secure communications module to securely transfer the data from the management storage system.

6. The data management system of claim 2, wherein the data storage device further includes a search module to search the data based upon metadata criteria.

7. The data management system of claim 2, wherein the management storage system further includes a characterization and indexing module for organizing the data based upon metadata captured along with the video data and audio data, and wherein the data storage device further includes a search module for searching the organized data.

8. The data management system of claim 1, wherein the second communication link further includes a download computer connected to the management storage system input/output interface and to which the data storage device is directly connected.

9. The data management system of claim 1, wherein the data storage device is connected to another computer and the viewer module is configured to display the data on the other computer without permanently transferring the data to the other computer.

10. A data storage device, something a user has, for receiving data from a management storage system via a communications link, the data storage device comprising:
a. a data storage device input/output interface for receiving the data via the communication link from the management storage system;
b. a data storage device memory for storing the data and software modules;
c. an authentication and security module stored in the data storage device memory and configured to communicate via the second communication link with a verification module of the management storage system in order to allow the data storage device to have access to the data in the management storage system wherein the verification module of the management storage system checks the validity of credentials of the user of the data storage device, the credentials being something the user knows and that the user supplies to the verification module of the management storage system, and wherein the verification module of the management storage system checks for the existence of a permanent unique identifier associated with the data storage device and supplied by the data storage device to the verification module of the management storage system, and based on checking the user credentials and the existence of the permanent unique identifier associated with the data storage device, the verification module determines whether the data storage device is entitled to receive a portion of the data to thereby ensure the integrity of the data, wherein the data is multimedia data including image data, audio data, and metadata and the data storage device further includes an audit trail record creation module configured to create an audit trail record for the data stored in the data storage device memory, the audit trail record including information about the circumstances under which the data is accessed from the data storage device, and wherein the audit trail is stored in the data storage device memory.

11. The data storage device of claim 10, wherein the data storage device further includes a data storage device processor for controlling the operation of the data storage device.

12. The data storage device of claim 10, wherein the data storage device further includes a viewer module for displaying the data.

13. The data storage device of claim 10, wherein the authentication and security module is configured to erase the data storage device memory if the user's credentials or the unique identifier are not valid.

14. The storage device system of claim 10, wherein the data storage device further includes a virtual private network secure communications module to securely transfer the data from the management storage system.

15. The storage device system of claim 11, wherein the data storage device further includes a search module to search the data based upon metadata criteria.

16. The data storage device of claim 15, wherein the data storage device further includes a messaging module to send messages to other authorized users with metadata search results and pointers to specific data segments.

17. The data storage device of claim 10, wherein the data storage device is connected to another computer and the viewer module is configured to display the data on the other computer without permanently transferring the data to the other computer.

18. A method for securely collecting and managing data comprising the steps of:
a. recording the data by a data recording system including:
i. capturing the data; and
ii transmitting the data via a first communication link from a data recording device to a management storage system;
b. receiving the data by the management storage system and processing the data including:

i. storing the data in a central storage device of the management storage system;
  ii. ensuring that the integrity of the data, as recorded by the data recording system, is maintained in the management storage system;
    iii. verifying whether a data storage device, something a user has, is authorized to have access to the data in the management storage system wherein a verification module of the management storage system checks the validity of credentials of the user of the data storage device, the credentials being something the user knows and that the user supplies to the verification module of the management storage system, and wherein the verification module of the management storage system checks for the existence of a permanent unique identifier associated with the data storage device and supplied by the data storage device to the verification module of the management storage system, and based on checking the user credentials and the existence of the permanent unique identifier associated with the data storage device, the verification module determines whether the data storage device is entitled to receive a portion of the data based on the credentials of the user and the unique identifier of the data storage device and to thereby ensure the integrity of the data; and
  iv. if the data storage device is authorized to have access to the data, delivering the data to the data storage device via a second communication link; and
c. receiving data by the data storage device from the management storage system and processing the data including storing the data in a data storage device memory of the data storage device,
  wherein the processing step by the data storage device further includes creating an audit trail by an audit trail creation module and storing the audit trail in the data storage device memory and wherein the audit trail includes information about the circumstances under which the data is accessed from the data storage device.

19. The method for securely managing data of claim 18, wherein the data includes image data, audio data, and metadata.

20. The method for securely managing data of claim 18, wherein the verifying step further includes erasing the data storage device memory if the user's credentials or the unique identifier are not valid.

21. The method for securely managing data of claim 18, wherein the step of storing data in the central storage device further includes characterizing and indexing the data by characterization and indexing module in the management storage system and wherein processing the data by the data storage device includes a searching the characterized and indexed data by a search module.

22. The method for securely managing data of claim 18, wherein the method further includes the step of displaying the data by a viewer module of the data storage device.

23. The method for securely managing data of claim 18, wherein the step of delivering the data to the data storage device via the second communication link that further includes downloading the data from the data management storage system via the second communication link to a download computer and directly connecting the data storage device to the download computer.

24. The method for securely managing data of claim 23, wherein the step of displaying the data by the viewer module includes connecting the data storage device to another computer and displaying the data on the other computer without permanently transferring the data to the other computer.

25. The method for securely managing data of claim 18, wherein processing the data by the data storage device includes sending the data to authorized third parties by means of a messaging module in the data storage device.

26. The method for securely managing data of claim 18, wherein the step of delivering the data to the storage device via a second communication link includes a virtual private network connection between the management storage system and the data storage device.

* * * * *